Sept. 21, 1954

R. L. ACKERMAN 2,689,803

METHOD OF PRODUCING A FILM OF
UNIFORM ELECTROCONDUCTIVITY
ON REFRACTORY BASES

Filed Nov. 3, 1951

INVENTOR.
ROBERT L. ACKERMAN
BY
Oscar L. Spencer
ATTORNEY.

Sept. 21, 1954

R. L. ACKERMAN 2,689,803

METHOD OF PRODUCING A FILM OF
UNIFORM ELECTROCONDUCTIVITY
ON REFRACTORY BASES

Filed Nov. 3, 1951

INVENTOR.
ROBERT L. ACKERMAN
BY
Oscar R. Spencer
ATTORNEY.

Patented Sept. 21, 1954

2,689,803

UNITED STATES PATENT OFFICE 2,689,803

METHOD OF PRODUCING A FILM OF UNIFORM ELECTROCONDUCTIVITY ON REFRACTORY BASES

Robert Lloyd Ackerman, New Alexandria, Pa., assignor to Pittsburgh Plate Glass Company Application November 3, 1951, Serial No. 254,728

7 Claims. (Cl. 117—37)

This invention relates to an improved method for depositing electroconductive transparent coatings upon ceramic or refractory viewing closures.

It is known that transparent electroconductive films may be deposited upon glass by applying stannic chloride to the surface of glass heated above 400° F., preferably 850 to 1350° F. Films of superior conductivity may be produced according to methods described in application for U. S. Letters Patent, Serial No. 762,658, filed July 2, 1947, now U. S. Patent 2,614,944, by William O. Lytle. These coatings are obtained by spraying plate, window or other glass while it is heated to a temperature of above 400° F. but below the temperature at which the glass becomes molten, with tin tetrachloride or other tin or metal salts in aqueous solution or in vapor state, in the presence of a reducing agent such as methanol, phenyl hydrazine hydrochloride, or other agents. The films thus obtained are of unknown composition but appear to contain a preponderant amount, of the order of 97 to 99%, of a tin oxide, and certain impurities which may include metallic tin, carbon, silicon, sodium and chlorine and other impurities, depending upon the composition of the applied tin containing solution.

These films have a thickness of about 50 to 800 millimicrons, are transparent and have the unusual characteristic of being electroconductive, the particular degree of electroconductivity being dependent to a large degree upon the nature of the process of depositing the films. Tin oxide films which are deposited in accordance with the process described above have a resistance below about 500 ohms per unit square and a specific resistance below about 0.002 ohm centimeters. The refractory bases having films thereon as described above are provided with suitable bus bars. Further details respecting the production of these films will be supplied hereinafter.

Articles produced according to the above description, further details of which will be supplied below, are suitable for use as viewing closures or windows. Usually they are laminated with a suitable plastic, such as polyvinyl butyral, to reinforce the glass and provide a so-called "safety glass" construction. These closures may be successfully heated by imposing an electric potential across the bus bars, thus using the conductive film as a resistance element.

A conventional method of applying a transparent electroconductive metal oxide film to a heated refractory base is to establish a spray of a suitable metal compound and pass the heated base through the spray at an angle of approximately 90° to the spray and at a constant rate of speed. However, it has been observed that the surface resistivity of the electroconductive film tends to be higher adjacent the leading and trailing edges of the base than in other areas of the base when this mode of spraying is employed. In many instances, such high surface resistivity of the electroconductive film in the areas adjacent the leading and trailing edges of the base is undesirable. Thus, it is desired that a method of applying the transparent electroconductive metal oxide film to the refractory base be provided which does not produce such leading and trailing edge effects in the transparent electroconductive film.

In the past, an unduly high number of windshields or like panels of the type herein described have failed in use or test. This failure frequently is manifested by fracture of the glass after an electric potential has been imposed across the bus bars to cause the film to be heated to a suitable temperature (for example 100 to 125° F. or above) for a period of time. Such failure has been discovered to be particularly apt to occur in certain panels having a contour such that the bus bars must be disposed in a non-parallel relationship.

It has been found that one of the causes of such failure is unequal distribution of current flow along one or both of the bus bars. When a panel is provided with non-parallel bus bars, the current flow through uniform surface resistivity films will tend to be highest at the point or points where the bus bars are closest together, and lowest at the point or points where the bus bars are farthest apart. In like manner, when one bus bar of a pair of bus bars (whether parallel or not) is longer than the other, the density of current flow and consequent heat generation tends to be highest at the ends of the shorter bus bar.

A further possibility occurs in the case of a non-rectangular panel having the shape of a parallelogram in which the bus bars are substantially parallel and equal in length. In such a case, the density of current flow and consequent heat generation tends to be highest at the terminus of the bus bar which is perpendicularly across from the opposed bus bar. Consequently, a large amount of current may flow to a bus bar at one point or area along its length and a relatively lower amount of current may flow to the bus bar at another point or area along its length.

It has been found that a substantial reduction in such failures may be accomplished by production of a transparent electroconductive film which has non-uniform surface resistivity, the surface resistivity of the film being greatest in the areas intermediate the bus bars where the bus bars are closest together, and lowest in the areas intermediate the bus bars where the bus bars are farthest apart. Production of such a film results in establishing substantially uniform resistance between opposed portions of the bus bars throughout their entire length.

According to this invention, a novel method of providing a refractory base, such as a glass base, with a transparent electroconductive metal oxide coating, such as tin oxide, having a desired surface resistivity or resistance per unit square pattern has been discovered. This method comprises establishing a spray of a metal compound, such as stannic chloride, by means of a spray gun, passing a refractory base heated to a temperature above 400° F. but below the temperature at which the base becomes molten, preferably 850 to 1350° F., through said spray and rotating the spray in a direction substantially parallel with the direction of movement of the base during a portion of the time which the base is in contact with the spray.

The direction of rotation of the spray may be either the same as, or opposite to, the direction of movement of the heated base through the spray. It may also move at a vertical angle to the direction of movement. The rotation may be at a constant rate of speed or varying rate of speed. The rate of rotation will also vary in accordance with the distance of the spray gun and pivot point from the heated base. When it is desired to overcome the leading or trailing edge effects described above, the spray gun is rotated in such manner that the leading or trailing edges of the refractory base remain in contact with the spray for a longer period of time than the rest of the base.

The spraying operation must be conducted within certain critical limits in order that a film of non-uniform resistance per unit square can be obtained. If the spraying operation is continued too long, the maximum amount of film is formed on all portions of the heated base and a film of substantially uniform thickness and uniform resistance per unit square is formed. Therefore, the complete spraying operation must be conducted within a matter of only a few seconds to produce a film of 25 to 800 millimicrons in thickness. Films having thicknesses greater than 800 millimicrons do not adhere to the base as well as thinner films.

The amount of film which can be formed on the base is a function of the amount of spraying solution brought into contact with the base while the base is at film formation temperature. After the temperature falls below the formation temperature, no further film is formed. Thus, in order to achieve a transparent electroconductive film of non-uniform thickness and non-uniform resistance per unit area by rotation of the spray gun during the spraying operation, the spraying must be discontinued before the film has achieved its maximum thickness, i. e., before the temperature of the glass surface falls below the film forming temperature. It is to be understood that if the spraying operation is continued up to or beyond this point of maximum film formation, a film of substantially uniform resistance per unit area is formed.

It is known that the amount of film formation and the resistivity of the film are also affected by the ingredients of the spraying solution, the humidity of the spraying atmosphere and the temperature of the base when sprayed, but such effects are not of great importance in achieving a film of non-uniform resistance per unit area by a single spraying operation for they exert the same effect on all portions of the film, thereby tending to form films of uniform resistance per unit area.

Accomplishment of the foregoing constitute some of the principal objects of the present invention, and the manner by which these and other objects of the invention are attained will be more fully understood by reference to the ensuing description taken in conjunction with the accompanying drawings in which.

Figure 1:
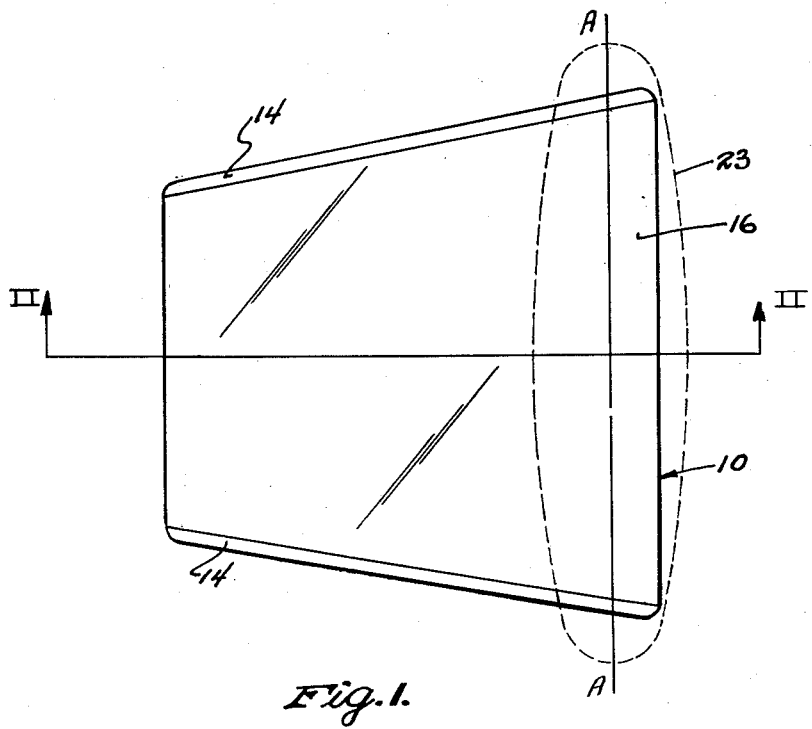
Fig. 1 is a diagrammatic plan view of a glass panel suitable for use as a windshield of an airplane, embodying the transparent electroconductive film produced according to the present invention.
Figure 2:
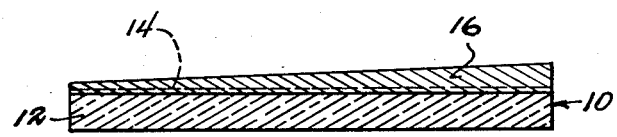
Fig. 2 is a diagrammatic sectional view taken along lines II—II of Fig. 1.

In the drawing, Figs. 1 and 2 diagrammatically illustrate a panel 10 which is produced by practice of this invention. The panel 10 comprises a trapezoidally shaped glass base 12 having bus bars or conductive marginal edge strips 14 of an electroconductive metal, such as gold, silver, copper, etc. along the non-parallel edges and close to the edges (preferably within 0.5 inch of the edge or on the edge) of the sheet. The bus bars may be connected to opposite poles of a source of potential (not shown). The panel 10 is provided with a transparent electroconductive film 16 which may be produced by spraying a tin compound or similar compound to a heated base, as hereinafter more fully described.

As shown with the film greatly enlarged in Fig. 2, the electroconductive film 16 is thinnest in the areas intermediate the closer termini of the bus bars and is thickest in the areas intermediate the termini of the bus bars which are farthest apart. Because of this variation in thickness, the surface conductivity or conductance per unit square of the latter areas is greater than that of the former areas.

In the production of panel 10, the glass base 12 is provided with conducting metal strips suitable for bus bars. These strips must be capable of withstanding the temperatures and oxidizing conditions of treatment, and, therefore, preferably should be of a ceramic character. Furthermore, they should be capable of glazing or otherwise forming an adherent, well bonded coating to the glass and should have a conductivity of at least 10 to 20 times that of the conductive coating 16. Generally, the metal strips 14 are from about 0.1 to 1 inch in width.

In practice, it has been found that the most satisfactory compositions, for use in preparing the bus bars, comprise a highly conductive metal powder (preferably gold or silver) and a vitrifying binder. The ingredients forming the vitrifying binder, for example, litharge, boric acid and silica, are heated to a sufficient temperature, for example 1700° F., to compel them to fuse and form a glass-like mass. This mass is then converted into a frit by grinding, usually in a ball mill. The electroconductive metal, such as finely divided silver, is then added to this frit and spraying or screening vehicles are added to the compositions to facilitate their application. Some of the vehicles usually employed are French fat oil, turpentine, water and ethyl alcohol.

In order to avoid production of bus bars which will develop, in use, excessive stresses in the glass, the bus bars preferably should be located on the extreme edge of the glass and the bus bar thickness should not exceed about 0.005 inch and, preferably, should be below about 0.003 inch.

After application of the metal bus bars to the glass sheet by painting or other method, the sheet is heated to the temperature at which application of the conductive coating may be effected, for example, above about 400 to 800° F. but below the fusion point of the glass, usually 950° to 1350° F. During this heating operation, the ceramic metal coating becomes glazed and is baked onto the glass so that a firm bond is established between the glass and the metal coating.

It is to be understood that certain types of metal bus bars may be applied after the electroconductive film is applied. In such cases, the glass sheet is heated and sprayed before the application of the bus bars.

Figure 3:
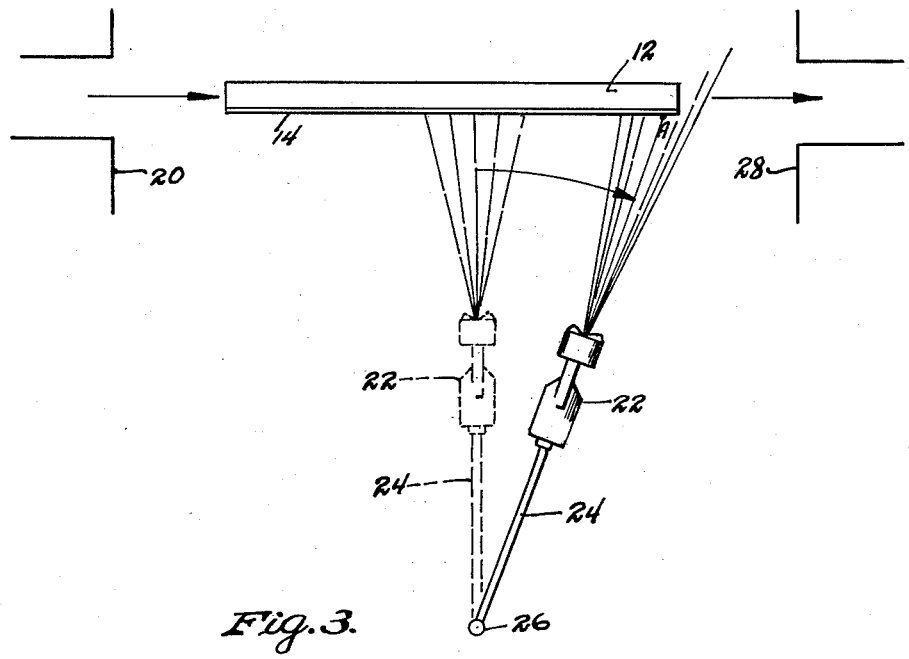
Fig. 3 is a diagrammatic plan view of a method of preparing a glass panel according to this invention.

As shown in Fig. 3, when the glass has been heated as described above, for 2 or more minutes, it is withdrawn from the heating chamber 20, and immediately sprayed with a film forming solution before substantial cooling of the glass sheet 12 can take place. Usually this spraying operation is conducted in air of atmospheric humidity or oxygen. However, conductive coatings have been obtained even when oxygen appears to be absent, although it is probable that oxygen either from the atmosphere or combined in water or similar compound, is present.

In this operation, a quantity of the coating solution is placed in an atomizing spray gun 22 and the heated glass sheet 12 is sprayed with an atomized spray of this material for a brief period. The pattern of the spray is in the shape of a vertically elongated oval as illustrated by the dotted lines 23 in Fig. 1.

The heated glass sheet 12 is passed through the spray by means of a conveyor at an angle of about 90° to the vertical plane of the spray with the longer parallel edge of the sheet being the leading edge. The spray gun 22 is mounted on a support 24 which pivots at a point 26 spaced several feet from the path of the heated glass sheet.

In a typical operation, the spray gun 22 is maintained stationary until the leading edge of the glass sheet has just passed through the spray and the center of the spray strikes the glass sheet on an imaginary line A which runs parallel to the leading edge of the glass sheet and is spaced about ½ the width of the spray at point of contact from the leading edge of the panel. When the center of the spray begins to impinge upon line A, the spray gun is then rotated in the direction in which the glass sheet 12 is moving so as to maintain the center of the spray on the line A for a period of several seconds. The rotation of the spray gun 22 is then stopped and the spray gun is maintained stationary as the remainder of the glass sheet passes through the spray. The rotation is usually terminated before the spray gun has passed through an angle of 15°. However, greater rotation may be employed if desired. Immediately after passing through the spray, the glass sheet 12 passes through tempering blowers 28 which rapidly cool the sprayed sheet by impinging blasts of cold air upon the sheet.

The following example illustrates a specific embodiment of the invention:

Example

A sheet of glass in the shape of a trapezoid is provided with a pair of ceramic silver bus bars and a transparent electroconductive tin oxide film. The height of the glass is 19½ inches, and the lengths of the parallel sides are 15¾ and 19 inches, respectively. A pair of ceramic silver bus bars are applied to the non-parallel edges of the glass. The glass is then placed in a furnace and heated at a temperature of 1150° F. for 2 minutes.

The glass sheet is then removed from the furnace and immediately passed through a spray of film-forming solution at an angle of about 90° to the path of the spray by means of a conveyor traveling at a rate of 1⅓ feet per second. The heated glass sheet passes through the spray so that the longest parallel edge of the sheet is the leading edge. The spray is in the shape of a vertically elongated oval, and the spraying solution is made up of the following ingredients:

| | |
|---|---:|
| Stannic chloride_____grams__ | 20,430 |
| Phenyl hydrazine hydrochloride___do____ | 639 |
| An aqueous solution of hydrofluoric acid containing about 48% by weight of hyfluoric acid_____grams__ | 134 |
| Distilled water_____milliliters__ | 7,056 |
| Dioctyl sodium sulfo-succinate solution _____milliliters__ | 918 |
| Methanol _____do____ | 2,250 |

When the glass sheet has entered the spray to a depth of about 2 inches, the spray is rotated for a period of 1.1 seconds in a direction parallel with and in the direction of movement of the glass sheet, always directing the spray at the same point on the glass sheet during the rotation. The spray gun is mounted on a support which pivots at a point 30 inches from the path of the glass sheet through the spray and the nozzle of the spray gun is about 17 inches from the pivot point.

After 1.1 seconds, the rotation of the spray is discontinued and the glass sheet continues through the spray. The total spraying time, i. e., the time when the spray is actually in contact with the glass sheet, is 2.5 seconds. The rate of flow of the film forming solution through the spray gun during this period is 7 grams per second.

By recourse to such method of spraying a metal compound such as stannic chloride on the heated refractory trapezoidally shaped base, a film having substantially the same resistance between opposing points of the bus bars throughout their length is produced. The film is thicker and more electroconductive in the areas intermediate the bus bars where the bus bars are farthest apart, and, therefore, the current flow through the electroconductive film is substantially the same between any pair of opposing points in the bus bars throughout their length.

Furthermore, the areas of the glass adjacent the leading edge of the glass sheet are provided with an electroconductive film having a surface conductivity higher than the surface conductivity of the film on other areas of the glass base instead of lower surface conductivity such as is produced according to conventional spraying techniques.

It will be understood that transparent electroconductive films having various surface resistivity distributions can be produced by varying the speed and/or direction of rotation of the spray gun with respect to the heated base to be coated.

Figure 4:
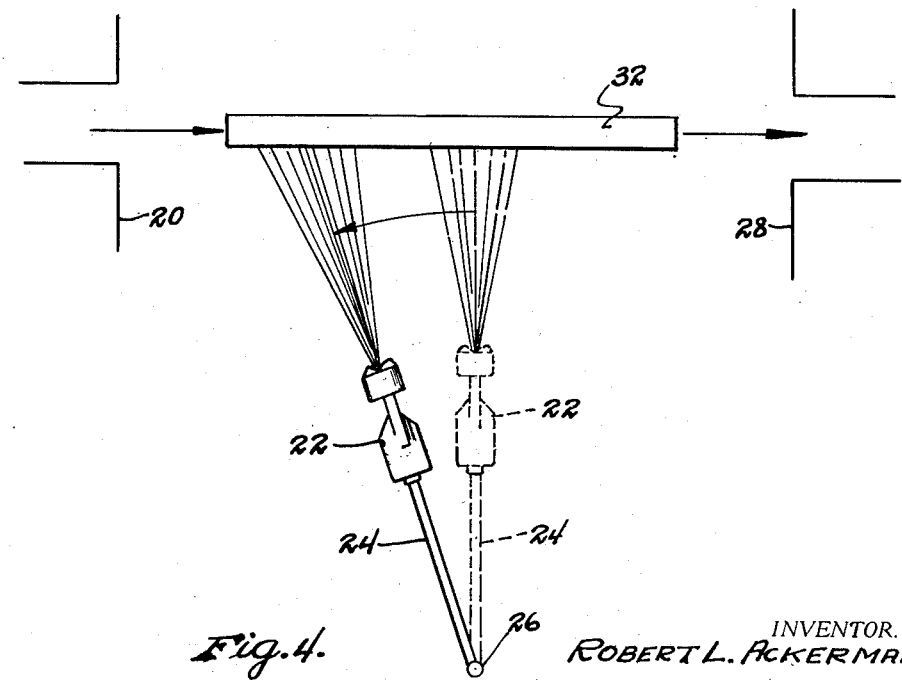
Fig. 4 is a diagrammatic plan view of a further method of preparing a glass panel according to this invention.

Fig. 4 illustrates an embodiment of the invention wherein the spray rotates in a direction opposite to the direction of movement of the heated base. As shown in Fig. 4, a refractory base 32 is heated in a furnace 20, removed from the furnace and immediately passed through a spray of film forming solution emanating from a spray gun 22 mounted on a support 24 which pivots at point 26 spaced several feet from the path of the heated refractory base.

The spray gun 22 and support 24 are rotated in a direction parallel with but opposite to the direction of movement of the base during a portion of the time which the base 32 is in contact with the spray. The time and extent of rotation are governed by the particular surface resistivity pattern desired in the transparent electroconductive film produced by such process. Immediately after passing through the spray, the glass sheet 32 passes through tempering blowers 28 which rapidly cool the sprayed sheet.

It is essential to the achievement of a transparent electroconductive film on a refractory base having a varying thickness and surface conductivity by means of rotating the spray gun during the spraying operation, that the whole spraying operation be completed before a maximum amount of film is formed on all portions of the base. If the spraying operation is continued too long, the maximum amount of film is formed on all portions of the heated base and a film of substantially uniform thickness and uniform resistance per unit square is formed. Therefore the complete spraying operation must be conducted within a matter of only a few seconds.

The amount of film that can be formed on the base is a function of the amount of spraying solution brought into contact with the base while the base is at film formation temperature. This can be controlled by employing certain rates of conveyor speeds in combination with the flow rates of spraying solution in addition to rotating the spray gun, so as to limit the time which the heated base is in contact with the spray and to limit the amount of spraying fluid which comes into contact with the base.

The invention is particularly applicable for use in connection with the deposition of a transparent tin oxide film. However the invention is also applicable in connection with tin oxide and other metal oxides in combination in the same film such as films containing a major amount, at least 70 to 80 per cent by weight of tin oxide with minor amounts of the oxides of antimony, copper, zinc, thallium, vanadium, chromium, manganese, cobalt, cadmium, indium and/or titanium. Furthermore, the invention is applicable with other transparent electroconductive metal oxide films such as cadmium oxide, zinc oxide, indium oxide, etc., which may be prepared by using the bromide, chloride or acetate of the corresponding metal or mixture thereof.

Where viewing closures for vehicles are to be provided, the base for the film normally is ordinary window or soda lime glass. Other refractory materials including borosilicate glass, china, mica, phosphate glass, silicon carbide, tungsten carbide, porcelain, stone or other refractory composition which melts at temperatures above 1150 to 1350° F. may be provided with electroconductive coatings in the same manner.

Although the present invention has been described with reference to the specific details of certain embodiments thereof, it is not intended that such details shall be regarded as limitations upon the scope of the invention except insofar as included in the accompanying claims.

I claim:

1. In the method of providing a refractory base, having a pair of non-parallel edges and which is heated above 400° F., but below the temperature at which the base becomes molten, with an electroconductive metal oxide film of non-uniform surface resistivity in a direction longitudinally of the non-parallel edges by spraying the base with a film forming compound, the improvement which comprises establishing a spray of the film forming compound, orienting the heated base so that its non-parallel edges are disposed in a direction longitudinally of a desired direction of movement of the base, passing the heated base at a uniform speed in a single direction through the spray, and rotating the spray in a single direction substantially parallel with the direction of movement of the base during only a portion of the time the base is in contact with the spray so as to provide a film connecting the non-parallel edges which is of greatest thickness in the area of greatest separation of said edges and of minimum thickness in the area of least separation of said edges, the film so formed having a current flow substantially the same between any pair of opposing points in the non-parallel edges throughout their length upon the application of an electric current thereacross.

2. In the method of providing a refractory base, having a pair of non-parallel bus bars and which is heated above 400° F. but below the temperature at which the base becomes molten, with an electroconductive metal oxide film of non-uniform surface resistivity in a direction longitudinally of the non-parallel bus bars by spraying the base with a film forming compound, the improvement which comprises establishing a spray of the film forming compound, orienting the heated base so that its non-parallel bus bars are disposed in a direction longitudinally of a desired direction of movement of the base, passing the heated base at a uniform speed in a single direction through the spray, and rotating the spray in a single direction substantially parallel with the direction of movement of the base during a portion of the time the base is in contact with the spray so as to provide a film connecting the non-parallel bus bars which is of greatest thickness in the area of greatest separation of said bus bars and of minimum thickness in the area of least separation of said bus bars, the film so formed having a current flow substantially the same between any pair of opposing points in the non-parallel bus bars throughout their length upon the application of an electric current thereacross.

3. The method of providing an unsymmetrical surface of a refractory base with a transparent electroconductive metal oxide film of non-uniform surface resistivity which comprises; heating a refractory base having an unsymmetrical surface including a plurality of areas at least one of which has a transverse dimension of greater length than the corresponding transverse dimension of the remaining areas, to a temperature above 400° F. but below the temperature at which the base becomes molten; establishing a spray of an electroconductive metal oxide-film-forming compound; passing the heated base at a uniform speed in a single direction transverse to said transverse dimensions of said unsymmetrical surface through the spray; rotating the spray in a single direction substantially parallel with the direction of movement of the base only during the time an area of the unsymmetrical surface of the base having the greatest transverse dimension is in contact with the spray to deposit a film having a different surface resistivity than that deposited on the remaining areas of said unsymmetrical surface when the spray is stationary; and maintaining relative movement between the base and the spray at a rate greater than will permit deposition of a maximum thickness of film, the film so formed having a current flow substantially the same between opposing points at the ends of any transverse dimension upon the applications of an electric current thereacross.

4. The method of providing a refractory base with a transparent electroconductive metal oxide film of non-uniform resistivity which comprises; heating a refractory base having a surface with spaced edges wherein at least one transverse axis of said surface normal to one of said edges has a greater length than that of another transverse axis parallel to and spaced from said first named axis, to a temperature above 400° F. but below the temperature at which the base becomes molten; establishing a spray of an electroconductive metal oxide-film-forming compound; passing the heated base at a uniform speed in a single direction transverse to said transverse axes of said surface through said spray; rotating the spray in a single direction substantially parallel to the direction of movement of the base only during the time the area containing transverse axes of greatest length is in contact with the spray to deposit a film having a different surface resistivity than that deposited on the remaining area of said surface when the spray is stationary; and maintaining relative movement between the base and the spray at a rate greater than will permit deposition of a maximum thickness of film, the film so formed having a current flow substantially the same between any pair of opposing points in the spaced edges throughout their length upon the application of an electric current thereacross.

5. In the method of providing a refractory base having leading and trailing edges and side edges with a transparent electroconductive metal oxide film wherein the total resistance of the film along current paths between the spaced side edges and in the areas adjacent the leading and trailing edges is substantially equal to that along current paths between said spaced edges in the remaining portions of the film which comprises heating said base to a temperature above 400° F. but below the temparture at which the base becomes molten, establishing a spray of the film forming compound, passing the heated base at a uniform speed in a single direction through the spray, rotating the spray in a single direction substantially parallel with the direction of the base during only the time the leading and trailing edges of the base are in contact with the spray to effect the deposition of a film of a different surface resistivity than is deposited when the spray is not being rotated and maintaining relative movement between the base and the spray at a rate greater than will permit deposition of a maximum thickness of film, the film so formed having a current flow substantially the same between any pair of opposing points in the spaced edges throughout their length upon the application of an electric current thereacross.

6. The improvement recited in claim 5 wherein the spray is rotated in the direction of movement of the base.

7. The improvement recited in claim 5 wherein the spray is rotated in a direction opposite that of the movement of the base.

References Cited in the file of this patent

UNITED STATES PATENTS

| Number | Name | Date |
| --- | --- | --- |
| 1,831,535 | Juers | Nov. 10, 1931 |
| 1,909,260 | Forbes | May 16, 1933 |
| 2,061,107 | Schellenger | Nov. 17, 1936 |
| 2,569,773 | Orr | Oct. 2, 1951 |
| 2,570,245 | Junge | Oct. 9, 1951 |
| 2,598,391 | Jones | May 27, 1952 |